United States Patent [19]

Gardner

[11] Patent Number: 4,684,454

[45] Date of Patent: Aug. 4, 1987

[54] SPUTTERING PROCESS FOR MAKING MAGNETO OPTIC ALLOY

[75] Inventor: Richard N. Gardner, Stillwater, Minn.

[73] Assignee: Minnesota Mining and Manufacturing Company, St. Paul, Minn.

[21] Appl. No.: 861,081

[22] Filed: May 8, 1986

Related U.S. Application Data

[60] Continuation of Ser. No. 742,477, Jun. 7, 1985, abandoned, which is a division of Ser. No. 495,175, May 17, 1983, abandoned.

[51] Int. Cl.$^4$ ............................................. C23C 14/42
[52] U.S. Cl. ............................. 204/192.2; 204/192.15
[58] Field of Search ........... 204/192 M, 192 P, 192 C, 204/298; 428/900

[56] References Cited

U.S. PATENT DOCUMENTS

| | | | |
|---|---|---|---|
| 3,427,154 | 2/1969 | Mader et al. | 75/132 |
| 3,607,698 | 9/1971 | Kay | 204/192 |
| 3,681,226 | 8/1972 | Vogel | 204/192 |
| 3,856,579 | 12/1974 | Allen et al. | 148/103 |
| 3,949,387 | 4/1976 | Chaudhari et al. | 340/174 |
| 3,965,463 | 6/1976 | Chaudhari et al. | 340/174 |
| 4,170,689 | 10/1979 | Katsui et al. | 428/900 |
| 4,238,277 | 12/1980 | Bril et al. | 156/643 |
| 4,324,631 | 4/1982 | Meckel et al. | 204/192 |
| 4,347,112 | 8/1982 | Togami | 204/192 |
| 4,367,257 | 1/1983 | Arai et al. | 428/220 |
| 4,404,077 | 9/1983 | Fournier | 204/192 |
| 4,405,436 | 9/1983 | Kobsyashi et al. | 204/192 |
| 4,407,894 | 10/1983 | Kadukura et al. | 204/192 |
| 4,411,963 | 10/1983 | Aine | 204/192 |
| 4,414,087 | 11/1983 | Meckel | 204/192 |
| 4,414,650 | 11/1983 | Ohta et al. | 365/122 |
| 4,438,508 | 3/1984 | Urner-Willie et al. | 365/122 |
| 4,497,870 | 2/1985 | Kudo et al. | 428/457 |

FOREIGN PATENT DOCUMENTS

| | | | |
|---|---|---|---|
| 3317101 | 11/1983 | Fed. Rep. of Germany . | |
| 3334923 | 3/1984 | Fed. Rep. of Germany | 11/10 |
| 3335689 | 4/1984 | Fed. Rep. of Germany . | |
| 2485241 | 12/1981 | France | 13/6 |
| 0107773 | 8/1980 | Japan | 204/192 |
| 0175113 | 10/1984 | Japan | 204/192 |
| 0139616 | 10/1984 | Japan | 204/192 |

OTHER PUBLICATIONS

Mansuripur, et al., "Optimum Disk Stuctures and Energetics of Domain Formation in Magneto-Optical Recording", *IEEE*, 1982, pp. 1241–1243.

Sakurai, Y., "RE-TM Amorphous Film for Magneto-Optical Recording", *IEEE Transactions of Magnetics*, vol. Mag.-19, No. 5, 9/83, pp. 1734–1736.

Stuart, R. V., "Vacuum Technology Thin Films and Sputtering", *Academic Press, Inc.*, New York, pp. 108–123.

Gill, et al., "Electron Microscopy of in-situ Ion Beam Sputtered Amorphous Gd—Fe Alloy Thin Films", *J. Appl. Phys.*, 49(3), Mar. 1978, pp. 1741–1743.

Burilla, C. T. et al., "Influence of Inert Gas Incorporated on Uniaxial Anisotropy of Sputtered GdCo Thin Films", *J. Appl. Phys.*, 49(3), 3/78, pp. 1750–1753.

Allen, R. and Connell, G. A. N., "Magneto-Optic Properties of Amorphous Terbium-iron," *J. Appl. Phys.*, 53, Mar. 1982, p. 2353.

Albert et al., "Influence of Biased Magnetron Deposition Parameters on Amorphous Gd—Co—Cu Properties", *J. Vac. Sci. Technol.*, vol. 14, No. 1, Jan./Feb. 1977.

(List continued on next page.)

*Primary Examiner*—John F. Niebling
*Assistant Examiner*—Nam X. Nguyen
*Attorney, Agent, or Firm*—Donald M. Sell; James A. Smith; Douglas B. Little

[57] ABSTRACT

A triode vacuum sputtering process, and vacuums in the range of $4 \times 10^{-3}$ to $6 \times 10^{-4}$ Torr are used to obtain amorphous rate earth/transition metal alloy thin films useful as magneto optic media. By adjusting process parameters such as substrate temperature, anode bias and deposition rate, the properties of the thin film can be altered.

6 Claims, 5 Drawing Figures

OTHER PUBLICATIONS

Gambino, R. J. and Cuomo, J. J., "Selective Resputtering-Induced Anisotropy in Amorphous Films", *J. Vac. Sci. Technol.*, Mar./Apr. 1978, pp. 296–301.

Graczyk, J. F., "Structure of Argon Sputtered Gd—Co and Gd—Co—Mo Amorphous Thin Films", *J. Appl. Phys.*, Mar. 1978, pp. 1738–1740.

Chen, Tu et al., "Thickness Dependence of Magneto-Optic Effects in TbFe Film", presented at the Optical Storage Data Conference, 1/17–20, 1983.

Togami, Y., et al., "Amorphous GdCo Disk for Thermomagnetic Recording", *J. Appl. Phys.*, Mar. 1982, pp. 2335–2337.

Takenouchi, A. et al., "Magneto-Optical Characteristics of Double-Layered Amorphous RE-Fe Films by rf Sputtering", *J. Appl. Phys.*, Mar. 1984, pp. 2164–2166.

SPUTTERING PROCESS FOR MAKING MAGNETO OPTIC ALLOY

This is a continuation of application Ser. No. 742,477 filed June 7, 1985 now abandoned which was a division of application Ser. No. 495,175 filed May 17, 1983 now abandoned.

TECHNICAL FIELD

This invention relates to amorphous thin film magnetic materials. More particularly, it pertains to magnetic compositions having magnetic anisotropy, whereby the thin film possesses a stable magnetic easy axis perpendicular to the plane of the film itself. These compositions can be used as light modulators, in which light interacting with the thin film is affected by the presence of a magnetic domain at the incident spot.

BACKGROUND

Magneto-optic recording media are also known by several other names: thermomagnetic media, beam addressable files, and photo-magnetic memories. All of these terms apply to a storage medium or memory element which responds to radiant energy permitting the use of such energy sources as laser beams for both recording and interrogation. Such media modify the character of an incident polarized light beam so that the modification can be detected by an electronic device such as a photodiode.

This modification is usually a manifestation of either the Faraday effect or the Kerr effect on polarized light. The Faraday effect is the rotation of the polarization plane of polarized light which passes through certain magnetized media. The Kerr effect is the rotation of the plane of polarization of a light beam when it is reflected at the surface of certain magnetized media.

Magneto optic recording media have several advantages over known magnetic recording media:

1. The spacing between the medium and the recording head is greater, thus reducing potential for contact and wear;
2. Using a pulsed laser beam as the writing means, very high density data storage is possible.
3. With an interference layer on top of a magneto optic layer, the medium is affected less by dust than magnetic media.

In magneto optical recording, data is written into a medium having a preferentially directed remanent magnetization by exposing a localized area (spot or bit) on the recording medium to an electromagnetic or other energy source of sufficient intensity to heat the recording medium above its compensation or Curie point temperature and simultaneously biasing the medium with a magnetic field. Preferably, the energy source is a laser which produces a monochromatic output beam. The magnetic field required to reverse the magnetization of the recording medium varies with the temperature to which the recording medium is brought. Generally speaking for a given material, the higher the temperature, the smaller the required magnetic field coercive force.

The write or record operation for both Curie point and compensation point writing is as follows:

1. The medium is initially in a demagnetized state having about equal numbers of magnetic domains with magnetization oppositely directed and perpendicular to the surface of the film. A domain is a stable magnetized region or theoretically the smallest stable magnetized bit. The medium may be subjected to a saturation magnetic bias field normal to the surface of the film in order to magnetize all the domains in one direction. Alternatively, a selected area of the medium may be magnetized by exposing said area to a continous light beam and a small magnetic bias field.

2. A small magnetic bias field oriented perpendicular to the surface or plane of the film, but oppositely directed to the magnetic field applied earlier is applied over the entire thin film medium.

3. With the biasing field in place, a light beam from a radiant energy source such as a laser beam is directed toward a selected location or bit on the film where it causes localized heating of the film to a temperature at or above the compensation temperature. When the laser beam is removed, the bit cools in the presence of the biasing magnetic field and has its magnetization switched to that direction. The medium, in effect, has a magnetic switching field which is temperature dependent. The magnetic biasing field applied to the irradiated bit selectively switches the bit magnetization, with the bit momentarily near its compensation temperature under the influence of the laser. The momentary temperature rise reduces the bit coercive force.

In the write operation, the write laser beam (e.g. about 8–12 mW) is focused to the desired diameter (e.g. 1.0 microns) onto the surface of the recording medium by an objective lens.

The memory element or recorded bit is interrogated, or read, nondestructively by passing a low-power (e.g. 1–3 mW) beam of polarized light (e.g. a laser beam) through the bit storage site for a sufficiently short time so as not to heat the medium to change its magnetic state. The read laser beam is normally shaped to a circular cross-section by a prism, polarized and focused to some small diameter (e.g. 1.0 microns) onto the recording medium by a lens. When the read beam has passed through the recorded spot, it is sent through an optical analyzer, and then a detector such as a photodiode, for detection of any change or lack of change in the polarization.

A change in orientation of polarization of the light is caused by the magneto-optical properties of the material in the bit or site. Thus, the Kerr effect, Faraday effect, or a combination of these two, is used to effect the change in the plane of light polarization. The plane of polarization of the transmitted or reflected light beam is rotated through the characteristic rotation angle $\theta$. For upward bit magnetization, it rotates $\theta$ degrees and for downward magnetization $-\theta$ degrees. The recorded data, usually in digital form represented by logic values of 1 or 0 depending on the direction of bit magnetization, are detected by reading the change in the intensity of light passing through or reflected from the individual bits, the intensity being responsive to the quantity of light which is rotated and the rotation angle.

Erasure can be accomplished by simply writing new information over old portions of the medium or by simply exposing any given bit with a laser beam of sufficient intensity and then cooling that bit in the presence of a magnetic field in the direction of the initially applied magnetic field. The entire storage medium can be erased by providing a large magnetic bias field in the original saturation direction which does not require a laser beam. Generally, in the recording process, the external biasing magnetic field is applied by a magnet set above or behind the magneto optic medium, and in the erasing process, the magnet is reversed in direction.

The signal-to-noise ratio (SNR) or carrier-to-noise ratio (CNR) of an erasable magneto optic medium is proportional to $\theta\sqrt{R}$, where R equals power reflectivity of the medium and $\theta$ is the angle of rotation. Forty-five decibels in a 30 kHz band width is generally considered the minimum CNR acceptable for direct read after write (DRAW) media. The speed at which the bits can be interrogated and the reliability with which the data can be read depends upon the magnitude of the magneto-optical properties, such as the angle of rotation, of the thin film and upon the ability of the interrogation system to detect these properties. An increase in the angle of rotation $\theta$ results in an increase in CNR.

For purposes of this discussion, the noise floor or noise level is measured at the average noise level.

The main parameters that characterize a magneto optic material are the angle of rotation, the coercive force ($H_c$) the Curie temperature and the compensation point temperature. The medium is generally comprised of a single element or multicomponent system where at least one of the components is an amorphous metal composition. Binary and ternary compositions are particularly suitable for these amorphous metal alloys. Suitable examples would be rare earth-transition metal (RE-TM) compositions such as: Gadolinium-cobalt (Gd—Co), Gadolinium-iron (Gd—Fe), Terbium-iron (Tb—Fe), Dysprosium-iron (Dy—Fe), Gd—Tb—Fe, Tb—Dy—Fe, Tb—Fe—Co, Terbium-iron-chromium (Tb—Fe—Cr), Gd—Fe—Bi (Bismuth), Gd—Fe—Sn (Tin), Gd—Fe—Co, Gd—Co—Bi, and Gd—Dy—Fe.

Japanese patent publication No. 56/143547 discloses a magneto optic medium of the type just discussed. It comprises a thin film of gadolinium-terbium-iron alloy in a ratio of 0.24/0.18/1 which film is more than 1000 angstroms thick when using the Kerr effect and 500 to 800 angstroms thick when using the Faraday effect. The film of this patent also has a 5400 angstrom thick glass (silicon dioxide) film on top of the Gd:Tb:Fe film.

The magneto optic amorphous thin films can be fabricated by known thin film deposition techniques, such as sputtering, evaporation and splat cooling. In splat cooling a hot liquid of the film constituents is incident on a cool surface where they are quenched and solidified rapidly to form an amorphous bulk film. Generally, no matter what deposition rate is used, the substrate temperature must be less than that at which crystallization occurs in order to provide amorphous magnetic materials.

The preferred process for thin film deposition is sputtering. Typical known sputtering conditions for amorphous thin films are: initial vacuum less than $1 \times 10^{-5}$ Torr; sputtering pressure of from $3 \times 10^2$ to $2 \times 10^{-2}$ Torr; pre-sputtering of a sputtering source of material to clear the surface thereof; substrate temperature of 30° to 100° C.; and an argon partial pressure.

In the cathodic sputtering process, argon gas ions bombard the solid alloy target cathode in the sputtering chamber dislodging metal atoms by transferring the momentum of the accelerated ions to the metal atoms near the surface of the target. The cathode is said to glow, and the mass of ionized gas between the cathode and the anode is a plasma. The substrate is placed at the anode, and the metal alloy atoms traverse the space between the anode and cathode to deposit or condense on the substrate.

The object of this invention is to enable the manufacture of a magneto optic medium which has a carrier-to-noise ratio of at least 45 decibels and has an excellent quality of interaction between the medium and the optical system to take advantage of the inherent quality of the medium. This involves not only maximizing theta, but also decreasing the intensity of the inherent noise level in the medium.

DISCLOSURE OF INVENTION

The present invention provides a new erasable magneto optical recording medium comprising a magnetizable, amorphous film, said film having a magnetic anisotropy perpendicular to the film surface, and said film being characterized by having a multiplicity of magnetic domains substantially all of which have a domain size of less than 500 angstroms in largest dimension. These films comprise a material composition containing an element with an unpaired electron, typically an alloy of at least one rare earth element and at least one transition metal. This magnetizable amorphous film enables the manufacture of media having a characteristic carrier-to-noise ratio of at least 47 decibels.

Although the magnetizable film is amorphous, it has different phases, which are defined as localized variations in density and/or composition within the film. The existence of different phases adjacent to one another is believed to give rise to perpendicular anisotropy. This property makes it possible to magnetize a bit in the direction opposite that of the film adjacent to it.

The characteristic magneto-optic angle of rotation of the magneto optic film, theta, is at least 0.24 degrees when measured with a helium neon laser at a wave length of 6328 angstroms and at least 0.4° measured with a laser diode at a wavelength of about 7800 to 8500 angstroms.

Many film substrates can be used. They may be formed of any material which is dimensionally stable, minimizing radial displacement variations during recording and playback. Semiconductors, insulators, or metals can be used. Suitable substrates include glass, spinel, quartz, sapphire, aluminum oxide, metals such as aluminum and copper, and polymers such as polymethyl-methacrylate and polyester. The substrate is typically in the form of a disc.

This medium can be incorporated into a multi-layer construction, wherein it is sandwiched between optical inteference layers. The resulting observed effective magneto optic rotations of polarized light with the sandwich construction (in the range of 2° to 10°) are relatively large and represent an improvement over values of theta reported for rare earth transition metal (RE-TM) multi-layer constructions in the literature.

The above-described erasable optical recording medium also has more precise bits (i.e. less average bit roughness) than known media, due to the smaller size of the domains (usually about 100 angstroms). Bits are typically 1 to 5 microns in longest dimension.

Although a Kaufman source or duoplasmatron could be used, the triode sputtering process is preferred for depositing the inventive amorphous thin films. Under ordinary, higher pressure cathodic sputtering conditions, the sputtered atoms lose kinetic energy through collision with gas molecules. The deposition rate is inversely proportional to sputtering pressure and the distance between the receiving surface and the cathode. Triode sputtering, in addition to the main anode and cathode, has a thermionic cathode (emitter) and anode which has the advantage that a plasma can be maintained at much lower pressures than a direct current glow discharge (even in a magnetic field or magnetron). The ability of a triode sputtering apparatus to maintain an argon plasma at very low vacuums permits the deposition of these thin films at vacuums in the range of $4 \times 10^{-3}$ to $6 \times 10^{-4}$ Torr. The metal atoms which diffuse across the space between the sputtering cathode and anode are able to strike the substrate at a higher energy than they would at a lower vacuum since there are fewer argon ions in the space to interfere with the motion of the metal atoms, giving a greater mean-free path.

With triode sputtering, there are also more nucleation sites on the substrate because of the statistically higher rate of bombardment by energetic film constituent (metal alloy) atoms. This is believed to lead to a magneto optic film having a smoother surface than otherwise would occur. This in turn, leads to a magneto optical recording medium in which the surface of the film yields a background noise level that is at least 50 decibels below the carrier level when a 2 milliwatt peak-to-peak laser beam modulated at about 5.0 megahertz is reflected from the unwritten medium moving at a linear velocity of about ten meters per second. For the media of this invention, background noise is usually at least 65 decibels below the carrier level under the conditions stated above.

Although the media of this invention are erasable, they may be used in the same application as write-once or non-erasable media.

DETAILED DESCRIPTION OF THE INVENTION

Figure 1:
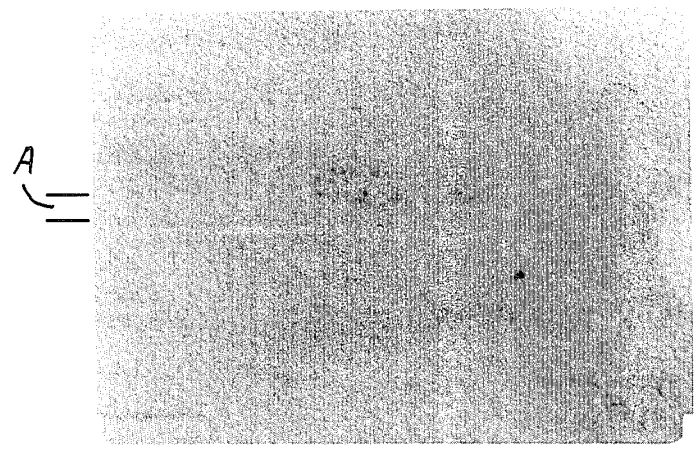
FIG. 1 is a transmission electron microscope photomicrograph at 200,000× of an amorphous metal alloy thin film magneto optical medium of this invention.

The good performance characteristics of these media (high $\theta$ and CNR) are thought to be attributable to physically identifiable features in the media. The two features believed to be most important are the existence of small domains and the optical constants of the recording medium (high refractive index and low extinction coefficient) for magnetizable amorphous films less than 500 angstroms thick. Index of refraction (n) and extinction coefficient (k) for a gadolinium-terbium-iron alloy film of this invention have been determined to be 4.5 and 1.8 respectively. Domain size is preferably less than 200 angstroms in largest dimension. FIG. 1 indicates domain boundary walls of 200 angstroms or less in largest dimension.

The magnetizable amorphous film of the media herein described contains an element having an unpaired electron. One amorphous alloy composition particularly well-suited to this invention is gadolinium-terbium-iron ternary alloy. The composition range preferred is 6-14 atom percent gadolinium, 10-16 percent terbium and 70-84 percent iron. The Curie point temperature of this medium is about 120° C. The thin films made of this composition are generally 100 to 400 angstroms thick and have a coercivity sufficient to create a stable memory. At a minimum, this should be about 500 Oersteds, but a range of 2000 to 3000 Oersteds is generally used.

Figure 2:
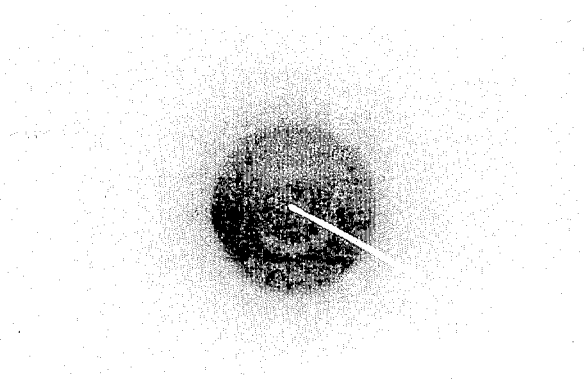
FIG. 2 is an electron beam diffraction pattern of an amorphous metal alloy magneto optical thin film medium of the invention.

As shown by FIG. 2, which is an electron beam diffraction pattern of such a ternary alloy made on a 200 keV apparatus, these materials show a diffraction pattern with broad halos that are not easily assigned a crystalline structure. In diffraction patterns, amorphous character is indicated by line broadening to the point where individual lines overlap. A broadened ring or fuzzy area which is divided by a concentric line is known as a split ring and indicates some short range ordering in the amorphous character of the film.

The information from the photographic image of the diffraction pattern can be translated to a profile plot of the diffracted intensity versus distance from the center of the diffraction pattern to give a more precise indication of amorphous character. The profiles of amorphous materials lack distinct peaks; whereas, those of crystalline materials have a number of quite distinct peaks indicating the lattice spacing or spacing between the atomic orbitals within the lattice.

As explained before, a triode sputtering process is suitable for depositing the magneto optic films of this invention. In the experiments by which this process was reduced to practice, the argon used for the sputtering was ultrahigh purity, (99.999 percent minimum purity). Argon flow rate into the triode sputtering apparatus was about 50 standard cubic centimeters per minute (scc/min), at a pressure of about 1.3 milli-Torr (which implies about 3 parts per million of gas present in the system). This represents a decrease in the presence of oxygen present in and flushed through the system by a multiple of at least 20 to 100 times less than ordinary direct current or radio frequency cathode sputtering.

The triode sputtering apparatus comprises a vacuum chamber containing a sputtering cathode target where the metal alloy is placed. The alloy sputters to provide an accumulation on the substrate which is placed on the anode substrate holder. The anode is held at a low negative bias voltage with respect to the chamber wall. The cathode target is water cooled, and the substrate can be made to rotate through an external drive means. A shutter is usually provided between the target and the anode to allow sputter cleaning of the substrate. Magnetically assisted triode sputtering is preferred, in which a magnetic field is imposed in line with the thermionic cathode and anode to confine the electrons to the plasma of ionizing gas and keep them away from the substrate where electron bombardment would cause heating. The sputtering chamber itself is made of stainless steel.

The optical properties of an amorphous thin film are a function of both the composition and the process by which the composition is formed or deposited. It is known that rare earth metals oxidize readily, and the control over this oxidation is an important part of the process of this invention to lead to a product of higher purity. If the anode is given a negative potential, with respect to the plasma, the resulting technique is referred to as bias sputtering. This bias is believed to cause a preferential removal of impurities such as oxygen from the main film by resputtering.

Radio frequency (RF) sputtering (rather than direct current) can be used to effect cleaning and to deposit insulators, such as transparent dielectric films. In this technique, a radio frequency alternating voltage is applied to the sputtering chamber by means of RF electrodes.

In operation, the sputtering chamber is typically pumped down to some initial background pressure (e.g. $4.0 \times 10^{-7}$ Torr) after which the sputter gas (argon) is introduced. Typically, the substrate is cleaned by pre-sputtering or sputter etching for about 60 seconds at a bias voltage of about 300 volts. The substrate is exposed to the flux of atoms from the target after the predetermined sputtering conditions have been reached. The deposition rate of the magneto optic film is generally 0.5 to 4.0 angstroms per second in the case of the gadolinium terbium iron ternary alloy. A thin film thermocouple is located near the anode substrate holder to measure the approximate substrate and equilibrium plasma temperature.

It is theorized that the higher vacuum of the triode apparatus results in thin films of higher density and higher index of refraction than known magneto optic films such as those of U.S. Pat. No. 3,965,463.

It has been observed that the character of the magneto optic film at its surface can be different from the bulk properties of the film. This has been particularly evident in comparing coercivity measurements for the surface and the bulk of an unpassivated film. $H_c$ (coercivity) has been found to vary by an order of magnitude in extreme cases. These changes are especially important in an optical memory system, since the interaction of the read optical beam and the RE-TM storage materials occurs in the first 150 to 200 angstroms of the film. Oxidation of the rare earth is suspected of being the main cause of changes in the characteristics of thin film at the surface. By coating the RE-TM films with a passivation layer, typically consisting of less than 300 angstroms thick of $SiO_x$, (x less than 2) the change in characteristics with time has been nearly eliminated, and higher magneto optic rotations have been measured than were previously obtained for RE-TM films without such a layer. This represents a significant increase in the stability of rare earth-transition metal magneto optical memory materials.

This effect, as well as other aspects of this invention, will be clarified by considering the examples which will follow in this description. They are intended to be purely exemplary.

EXAMPLE I

A magneto optic film of a specified thickness was deposited on a reflector. This bi-layer was then overcoated with a third layer of $SiO_x$ dielectric. The choice of the reflector generally relates to its efficiency of reflectivity at the wavelength of interest. The thickness of the magneto optic film will be dependent upon its optical properties as observed at the wavelength of the light of interest. The magneto optic material must be semi-transmissive in order to obtain increases in rotation from both the Faraday and Kerr effects. Films of Gd (11 atom percent) Tb (11 atom percent) with the balance being Fe (as determined by X-ray fluorescence) were deposited on copper coated (reflective layer) and uncoated plain glass slides. The angle of rotation, theta, was measured both with a helium neon (HeNe) laser, (wavelength 6328 angstroms) and a laser diode (L.D. wavelength 8300 angstroms). The results are given in Table 1 below.

TABLE 1

| Sample Number | Substrate Cu Coated Glass | Substrate Uncoated Glass | Magneto-Optic Film Thickness | SiOx Thickness | Rotation Angle HeNe | Rotation Angle L.D. |
|---|---|---|---|---|---|---|
| 132 | X | | 385° A | 270 | 0.27 | 0.47 |
| 139 | X | | 385° A | 950 | 1.12 | 1.10 |
| 138 | X | | 385° A | 1025 | 1.32 | 1.37 |
| 140 | X | | 385° A | 1065 | 1.27 | 1.55 |
| 145 on 144 | X | | 385° A | 1100 | .45 | 1.71 |
| 141 | X | | 385° A | 1200 | 1.21 | 1.69 |
| 142 | X | | 385° A | 1240 | 0.87 | 1.96 |
| 143 | X | | 385° A | 1300 | 0.45 | 1.73 |
| 130 | X | | 300° A | 300 | 0.36 | 0.47 |
| 129 | X | | 300° A | 435 | 0.35 | 0.44 |
| 128 | X | | 300° A | 610 | | 0.70 |
| 126 | X | | 300° A | 740 | | 0.85 |
| 133 | X | | 300° A | 878 | 1.75 | 1.21 |
| 137 | X | | 300° A | 950 | 1.30 | 1.43 |
| 134 | X | | 300° A | 1010 | 0.86 | 1.68 |
| 136 | X | | 300° A | 1050 | 0.99 | 1.55 |
| 135 | X | | 300° A | 1195 | 0.68 | 1.48 |
| 132 | | X | 385° A | 270 | 0.08 | 0.17 |
| 139 | | X | 385° A | 950 | 0.18 | 0.23 |
| 138 | | X | 385° A | 1025 | 0.41 | 0.29 |
| 140 | | X | 385° A | 1065 | 0.36 | 0.25 |
| 141 | | X | 385° A | 1200 | 0.24 | 0.18 |
| 142 | | X | 385° A | 1240 | 0.58 | 0.26 |
| 143 | | X | 385° A | 1300 | 0.47 | 0.54 |
| 130 | | X | 300° A | 300 | 0.04 | 0.11 |
| 129 | | X | 300° A | 435 | 0.06 | 0.17 |
| 128 | | X | 300° A | 610 | | |
| 126 | | X | 300° A | 740 | 0.01 | 0.11 |
| 133 | | X | 300° A | 878 | 0.03 | 0.12 |
| 137 | | X | 300° A | 950 | 0.31 | 0.12 |
| 134 | | X | 300° A | 1010 | 0.67 | 0.15 |
| 136 | | X | 300° A | 1050 | 0.19 | 0.16 |
| 135 | | X | 300° A | 1195 | 0.73 | 0.14 |
| 144 | X | | 385° A | 0 | 0.23 | 0.40 |
| 147 | X | | 970° A | 950 | 0.70 | 0.76 |

TABLE 1-continued

| Sample Number | Substrate | | Magneto-Optic Film Thickness | SiOx Thickness | Rotation Angle | |
|---|---|---|---|---|---|---|
| | Cu Coated Glass | Uncoated Glass | | | HeNe | L.D. |
| 147 | | X | 970° A | 950 | 0.68 | 0.75 |

The thicknesses of the magneto optic film and the silicon suboxide film were measured by a double beam interferometer. These results indicate the dependence of rotation angle on both the thickness of the magneto optic film and that of the interference film. They also indicate the clear advantage of using a magneto optic film deposited over a reflector.

Various apparatus and methods are available and known to the art for reading data stored in magneto optic media, as is illustrated in U.S. Pat. No. 3,651,281 FIG. 3 and column 6 and 7. The same sort of arrangement may be used to test magneto optic media with some modifications. The basic testing apparatus comprises a laser diode emitting a beam which is directed by means of various dielectric mirrors, plano mirrors, polarizers, lenses and prisms to the magneto optic medium, and from there to a set of detectors which translate the intensity of the rotated light beam into an electronic signal. The laser diode emits a diverging beam at a wavelength about 8300 angstroms, which is polarized, modulated, collected and collimated by a lens and made circular by a prism. This circular beam is directed by mirrors through a focusing head onto the medium. By virtue of the combined Kerr and Faraday rotations, the plane of polarization of the light is rotated through angle theta. Upon reflection, all of the rotated light, as well as part of the non-rotated light, is directed onto a read path through polarizing beam splitters and toward photodiode detectors. Focusing of the read beam onto the medium can be done by imaging optics means (e.g, a TAOHS type 0.6 NA lens head from Olympus Co.)

A biasing magnet is located near the medium at the point where the beam strikes it. The bias field used in recording can influence carrier-to-noise ratio. However, as long as the bias field is more than about 300 oersteds, CNR is relatively independent of bias field strength.

Figure 4:
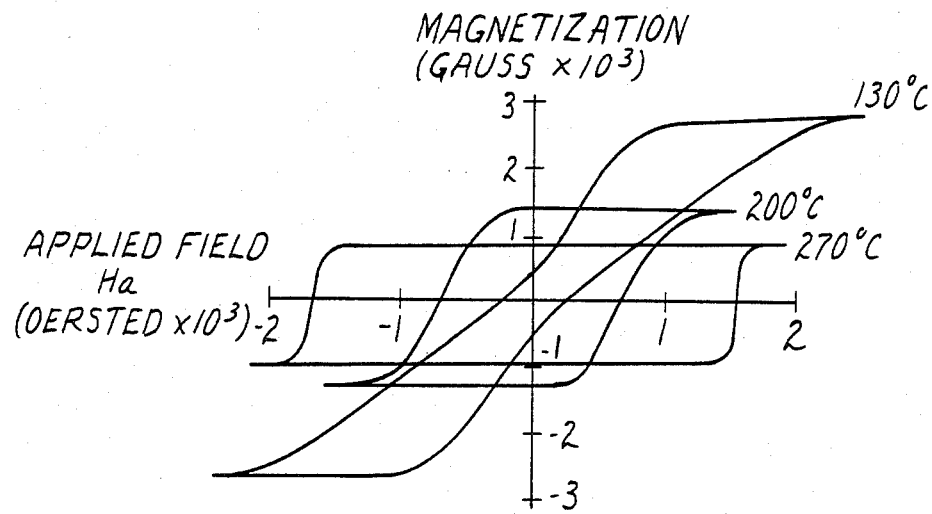
FIG. 4 is a set of magnetic hysteresis loops for magneto optic films of this invention.
Figure 5:
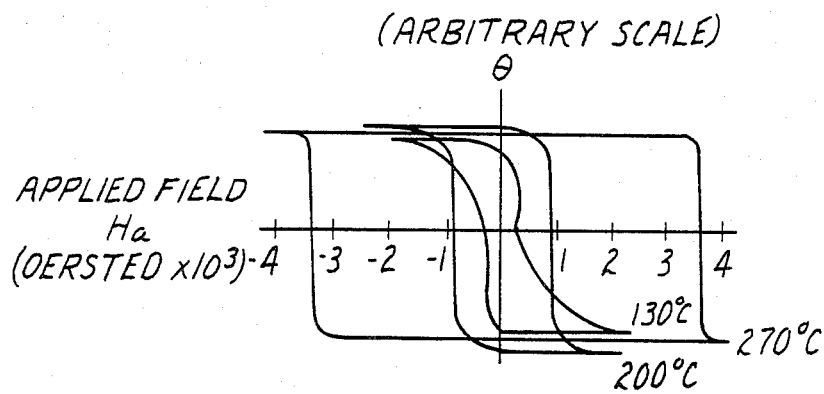
FIG. 5 is a set of optical hysteresis loops for magneto optic films of this invention.

The triode sputtering process can be used to control several parameters of the final magneto optic film. The magnetic and optical hysteresis curves depicted in FIGS. 4 and 5 represent the characteristics of three gadolinium, terbium, iron alloy films produced by triode sputtering under 3 different conditions. The films were all of the same composition (13.5 percent gadolinium, 16 percent terbium and 70 percent iron), and they were all about 2000 angstroms thick. Film DC1 was sputtered on at 130° C.; DC2 at 200° C.; and DC11 at 270° C. It is the more rectangular hysteresis loops of Sample DC11 which are desired.

An additional series of experiments showed that a decreasing rare earth concentration results in an increased tendency to form a longitudinal component in the magneto optic film. An applied magnetic field around the target in the sputtering process also results in the formation of a longitudinally oriented medium. On the other hand, an increase in the deposition rate results in the suppression of the longitudinal component of the ternary alloy to some extent.

It is believed the two perpendicular amorphous phases, which are necessary to the existence of domains adjacent to each other, are dependent upon deposition rate, temperature, and film thickness.

Also, the anode or substrate bias has been found to be a useful control in the triode sputtering process. In one series of experiments, keeping all conditions the same except for substrate bias, which was varied from 0 volts to 623 volts, it was found that the rectilinearity of the magnetic hysteresis curve was increased substantially with increasing anode bias.

When a magnetizable amorphous film is deposited on a reflector, it is known that the magneto optic rotation is increased because the Faraday effect is added to the Kerr effect. The former effect rotates the plane of polarization of the light as it passes back and forth through the magneto-optic layer while the Kerr effect rotates it at the surface of the layer. Therefore, it is beneficial to deposit the magnetizable amorphous films on a substrate which has been reflectorized. Typical reflecting layers are copper, aluminum or gold.

The performance of these media may also be improved by interference enhancement. The read beam reflected from a magneto optic medium has a regular component $I_x$ and a magneto optically induced component $I_y$. The magnitude of the light rotation effect $I_y$ is determined both by the inherent properties of the medium and the ability to transmit the rotated radiation from the medium to some outside detecting means. This latter aspect is affected by optical interference layers. In addition to optical effects, an overlayer of transparent dielectric, such as glass, can reduce the effect of oxidation on the amorphous metal alloy. Such overlayers also reduce the effect of dust and impurities on the transmission of the read beam. These media are generally known as interference enhanced media. The recording sensitivity of the magnetic thin layer varies in response to the thickness of the dielectric interference layer covering it and also with the magneto optic amorphous alloy composition and the wave length of the incident light.

The dielectric anti-reflection coating on top produces some gain; however, further increases in the efficiency of conversion can be brought about by a tri-layer film in which the magneto optic film is deposited on a transparent dielectric film which itself rests on an opaque reflector. This intermediate dielectric layer ideally has a thickness of some integer multiple of $\lambda/4$, where $\lambda$ is the wavelength of the read beam light. When this condition is met, the rotated component ($I_y$) of the magneto optically induced light, which is emitted both forwards and backwards from the magneto optic thin film, is maximized by in phase addition of the exiting rays. An overlayer of a transparent anti-reflective dielectric film can also be used in conjunction with the intermediate layer. In this case, the structure is known as a quadrilayer structure.

Example II

A polymerically subbed polished aluminum disc, having a diameter of 30 centimeters was provided. This disc had been made by coating a polished aluminum disc, which had been previously cleaned, with a polymer (e.g. styrene-butadiene polymer). A solution of the polymer (e.g. about 4% solids in a solvent with a boiling sample 34-195 was recorded and read at a 115 mm radius on the disc.

TABLE 2

| Sample | 34-195 | 34-195 | 34-195 | 34-195 | 34-195 | 34-195 | 34-195 | Pub. 1 | Pub. 2 | Pub. 3 | Pub. 4 | Pub. 5 |
|---|---|---|---|---|---|---|---|---|---|---|---|---|
| Write laser Power (mW) | 6.0 | 7.0 | 8.0 | 9.0 | 10.0 | 11.0 | 12.0 | 8 | 6 | 6 | 5 | up to 2.5 |
| Recording Frequency (MHz) | 2 | 2 | 2 | 2 | 2 | 2 | 2 | | | | | |
| Magnetic bias field (Oe) | 600 | 600 | 600 | 600 | 600 | 600 | 600 | | | | | |
| Resolution Band Width Frequency (KHz) | 30 | 30 | 30 | 30 | 30 | 30 | 30 | 30 | 30 | 30 | 30 | 30 |
| Read Laser Power (mW) | 2.0 | 2.0 | 2.0 | 2.0 | 2.0 | 2.0 | 2.0 | 2.5 | 2.5 | 2.5 | 2.5 | 2 |
| Carrier to Noise Ratio (dB) | 43.4 | 49.2 | 50.5 | 51.5 | 52.2 | 52.4 | 52.7 | 40 | 40 | 44 | 40 | 40 |
| Compensation Point (°C.) | 118 | 118 | 118 | 118 | 118 | 118 | 118 | 160 | 140 | 140 | 140 | |
| Disc speed (rpm) | 780 | 780 | 780 | 780 | 780 | 780 | 780 | 1350 | 1350 | 1350 | 1350 | 720 | point greater than about 140° C.), had been applied to the disc (while it was spinning). The solvent was evaporated, leaving a thin polymeric subbing layer. The function of the subbing layer is to provide a very smooth surface for recording. The polymer should wet and adhere to the aluminum surface.

The subbed disc was coated with chromium oxide (to promote adhesion of the reflecting layer) by magnetron sputtering using a chromium target in an atmosphere of argon, water vapor and air. The chromium oxide sputtering was continued for about one to two minutes at a target current of about 500 mA and a background operating pressure of about $2 \times 10^{-5}$ Torr, thereby obtaining a nucleation, adhesion-promoting layer or about 40 angstroms thick.

Over this, a reflecting copper layer about 1000 angstroms thick was applied by vacuum, resistance evaporation at a background pressure of about $2 \times 10^{-6}$ Torr. The substrate thus prepared was cleaned by sputter etching for about 60 seconds at a bias voltage of about 300 volts in the presence of argon. An intermediate glass film of silicon suboxide ($SiO_x$) was deposited from a silicon-monoxide smoke source (obtained from RD Mathis Company in Long Beach, Calif. to a thickness of about 250 angstroms by sputtering.

The triode sputtering method was then used to coat the prepared substrate with gadolinium, terbium, iron alloy. High-purity argon gas was leaked into the triode sputtering apparatus creating a background pressure of about $1.2 \times 10^{-3}$ Torr, and the deposition of the ternary alloy film was carried out under a substrate bias of about 300 volts and a target bias of about 300 volts. The deposition rate was in the range of 2.5 to 3 angstroms per second with a final film thickness of about 285 angstroms. At a vacuum of less than about $9.0 \times 10^{-7}$ Torr, a glass overcoat of about 1360 angstroms thick was deposited from an $SiO_x$ smoke source.

The alloy target used to create this magneto optic film was a mosaic of the desired constituents. Final composition of the deposited films was determined by energy dispersive X-ray fluoresence spectroscopy. The composition of the produced sample number 34-195 was determined to be 6.5 atom percent gadolinium, 10.0 percent terbium and 83.5 percent iron.

Table 2 indicates various magneto optic properties of Sample 34-195 and compares them to certain published values of known magneto optic media. All the data for Samples Pub 1-4 are taken from Imamura, Nobutake, "The Development of Magneto-Optical Disc Memory With Semi-conductor Lasers", KDD Research and Development Laboratory, Tokyo, Japan, and the data for sample Pub-5 is taken from Bell, Alan E., "Optical Data Storage" Laser Focus, January, 1983.

FIG. 1 is a transmission electron microscope photomicrograph of the medium of sample 34-195 at 200,000×. The very small domain size is suggested by this photograph. The space between the hash marks A denotes a distance of 200 angstroms, and the small identifiable spots, believed to represent domains, appear smaller than distance A in largest dimension.

Figure 3:
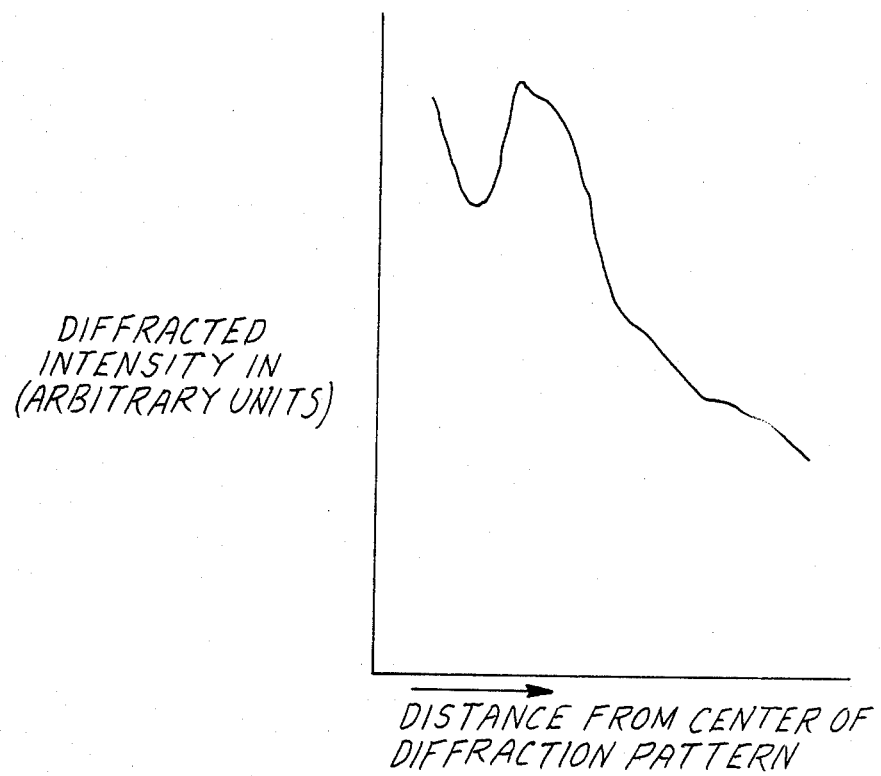
FIG. 3 is a profile of the electron beam diffraction pattern for the inventive magneto optic medium in FIG. 2.

FIGS. 2 and 3 are the electron beam diffraction pattern and profile respectively for the medium of sample 34-195, showing its amorphous character.

Except for the carrier to noise ratio at the lowest write laser power of 6 milliwatts, the carrier-to-noise ratio of the inventive sample is significantly greater than that of the published media. It is felt that a CNR of at least 60 can be obtained using the techniques and materials described above.

While certain representative embodiments and details have been shown for the purpose of illustrating the invention, it will be apparent to those skilled in this art that various changes and modifications may be made in this invention without departing from its true spirit or scope which is indicated by the following claims.

I claim:

1. A process for making an amorphous magneto optic thin film recording medium consisting essentially of sputtering the film constituents, which comprise at least one rare earth element selected from the group consisting of gadolinium, terbium, and dysprosium, and at least one transition metal selected from the group consisting of cobalt, iron and chromium, onto a substrate, utilizing a triode sputtering apparatus at a pressure of less than $4 \times 10^{-3}$ Torr, and continuing the sputtering until an amorphous magneto optic thin film having a thickness of up to 2000 Angstroms has been deposited.

2. The process as recited in claim 1 wherein the film constituents are selected from the following combinations of rare earth elements and transition metals: Gadolinium-cobalt (Gd—Co), Gadolinium-iron (Gd—Fe), Terbium-iron (Tb—Fe), Dysprosium-iron (Dy—Fe), Gd—Tb—Fe, Tb—Dy—Fe, Tb—Fe—Co, Terbium-iron-chromium (Tb—Fe—Cr), Gd—Fe—Bi (Bismuth), Gd—Fe—Sn (Tin), Gd—Fe—Co, Gd—Co—Bi, and Gd—Dy—Fe.

3. A process for making an amorphous magneto optic alloy continuing the sputtering until an amorphous magnetooptic thin film having a thickness of up to 2000 Angstrom has been deposited by sputtering the alloy constituents, which comprise at least one rare earth element and at least one transition metal, onto a substrate consisting essentially of the following steps:

A. placing a substrate within a triode sputtering apparatus;

B. introducing sputtering gas into the sputtering apparatus;

C. sputtering from a target comprising the alloy constituents in the desired proportions located within the sputtering apparatus at a pressure less than $4 \times 10^{-3}$ Torr to form an amorphous magneto optic film on the substrate continuing the sputtering until an amorphous magnetooptic thin film having a thickness of up to 2000 Angstrom has been deposited and D. coating said amorphous magneto optic film with a passivating layer sufficient to prevent significant changes in coercivity of said amorphous magneto optic film with time.

4. The process of claim 3 in which magnetically assisted triode sputtering is used.

5. The process of claim 3 in which the deposition rate of magneto optic thin film on the substrate is from about 0.5 to about 4.0 Angstroms per second.

6. The process as recited in claim 3 wherein the rare earth element is selected from the group consisting of gadolinium, terbium and dysprosium, and the transition metal is selected from a group consisting of cobalt, iron and chromium.

* * * * *

UNITED STATES PATENT AND TRADEMARK OFFICE
CERTIFICATE OF CORRECTION

PATENT NO. : 4,684,454

DATED : August 4, 1987

INVENTOR(S) : Richard N. Gardner

It is certified that error appears in the above-identified patent and that said Letters Patent is hereby corrected as shown below:

On the title page:

In "OTHER PUBLICATIONS" at Sakurai, word in title should be Films, not Film.

In Column 4, line 48, "inteference" should be --interference--

In Column 11, line 35, "or" should be --of--

In Table 2, last vertical column, "up to 2.5" should be moved down one line to Recording Frequency line.

In Column 13, lines 4 - 6, "continuing the sputtering until an amorphous magnetooptic thin film having a thickness of up to 2000 Angstrom has been deposited" should be cancelled.

In Column 14, line 3, "ited and" should be --ited; and--

Signed and Sealed this

Twenty-second Day of December, 1987

Attest:

DONALD J. QUIGG

Attesting Officer

Commissioner of Patents and Trademarks